Oct. 7, 1969   J. A. ROBERTS   3,471,746
HALOGEN GAS DETECTOR WITH INHERENT TEMPERATURE SENSING
Filed May 26, 1967
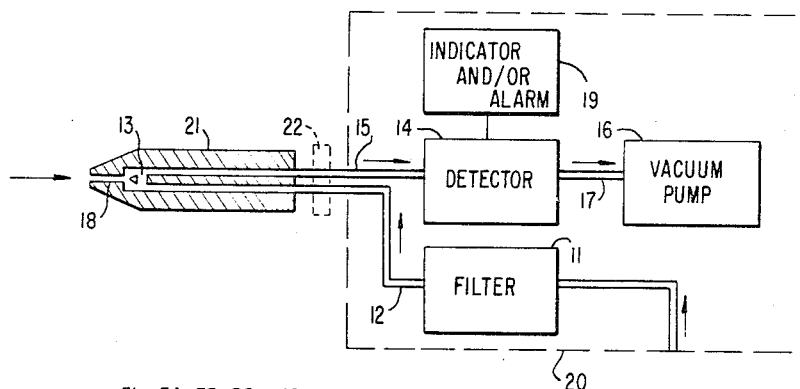
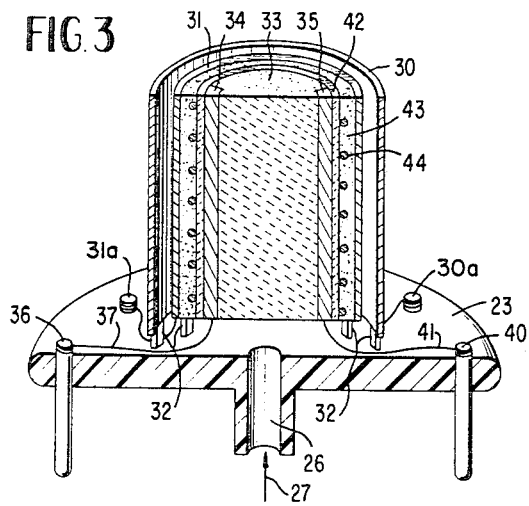
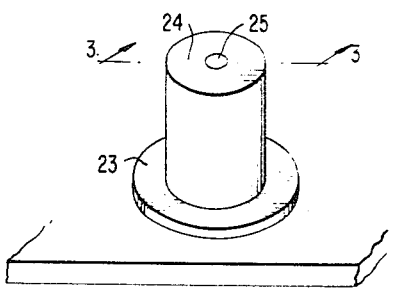
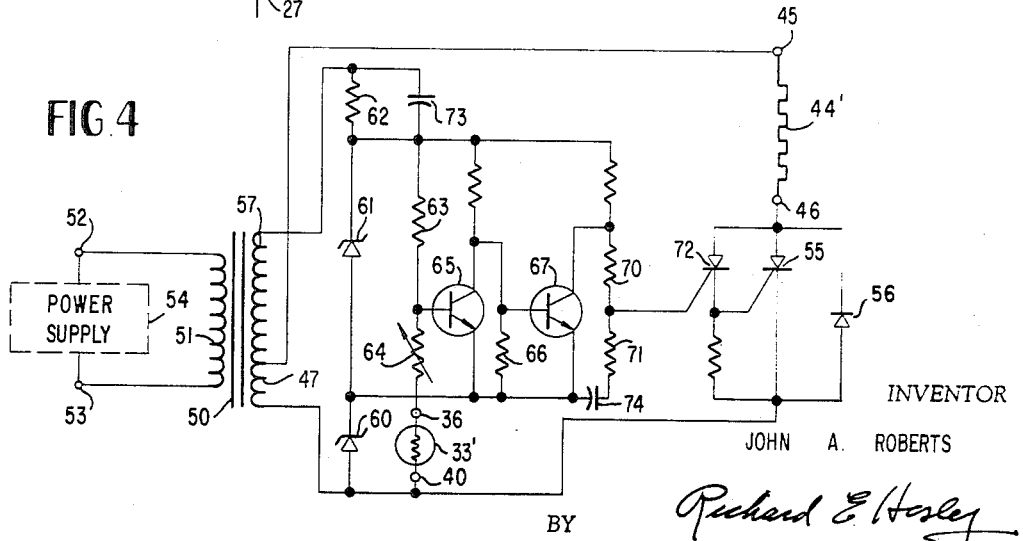
INVENTOR
JOHN A. ROBERTS
BY Richard E. Horley
ATTORNEY

United States Patent Office 3,471,746
Patented Oct. 7, 1969

3,471,746
HALOGEN GAS DETECTOR WITH INHERENT TEMPERATURE SENSING
John A. Roberts, Lynnfield Center, Mass., assignor to General Electric Company, a corporation of New York
Filed May 26, 1967, Ser. No. 641,619
Int. Cl. H01j 7/24
U.S. Cl. 315—111          10 Claims

ABSTRACT OF THE DISCLOSURE

A halogen gas detector with sensor temperature control. A sensor has a central emitter core member formed of a thermistor material having spaced electrodes thereagainst to indicate the sensor temperature. A temperature control circuit connected to the spaced electrodes controls energization of a sensor heater.

BACKGROUND OF THE INVENTION

This invention generally relates to halogen gas leak detectors and more specifically to a halogen gas leak detector having means for controlling the temperature of a sensor.

It is known to detect leaks in vessels, pipes and other closed systems through the presence of certain halogen tracer gases or vapors which pass into the surrounding atmosphere and are drawn through a probe into equipment to detect and indicate the presence of such gases or vapors. The system may include an electrical gas discharge device in which the gas to be detected induces ions at a rate which varies with the concentration of the substance. These ions are collected at oppositely charged emitter and collector electrodes and produce a current indicative of the concentration of the gas to be detected. A method and apparatus for detection by such a method is described and claimed in Patent 2,550,498, Chester W. Rice, issued Apr. 24, 1951, and assigned to the same assignee as the present invention.

In such systems the sensing element is generally heated to a temperature in the order of 900° C. to provide required instrument sensitivity. However, the sensitivity has been found to increase logarithmically with temperature in the operating range. As the heat input to the sensor from electrical heating means varies as the square of line voltage applied to the heating means, a relatively minor voltage variation can cause a sensitivity variation which could render the instrument unreliable. This is especially true in low concentration measurements.

In spite of this problem, some instruments constructed in the prior art have usually had no temperature control or current regulation. Others may incorporate a current regulation circuit based upon empirical heat loss data to provide a constant heat input. When extreme accuracy has been required, the heater current has been sensed by emission limited diodes which produce controls signals through relatively complex electrical circuit means. As is now obvious, none of the prior art circuit enabled a leak detector to be constructed with an economic, accurate sensor temperature control.

Therefore, it is an object of this invention to provide a halogen gas detector which provides more accurate readings by stabilizing sensitivity.

Another object of this invention is to provide a halogen gas detector wherein the sensor includes means for sensing its own temperature.

Still another object of this invtntion is to provide a halogen detector system which incorporates an economic, accurate sensor operating temperature control.

SUMMARY

In one aspect of this invention, the halogen gas detecting element or sensor has an internal emitter electrode formed about and contiguous to a core element. One portion of the core is formed of a thermistor material which is electrically and mechanically stable at the operating temperature and which exhibits resistance change at the operating temperature. This thermistor element serves as a variable resistance element in a temperature control circuit to control the energization of an electrical heating element.

This invention is pointed out with particularity in the appended claims. However, further objects and advantages of this invention may be understood by referring to the following description taken in conjunction with the accompanying drawings.

BRIEF DESCRIPTION OF THE DRAWINGS

FIGURE 1 schematically illustrates a leak detector system adapted to use this invention;

FIGURE 2 perspectively presents an exterior view of the sensing element;

FIGURE 3 is a cross-sectional view of the sensor in FIGURE 2 taken along the lines 3—3; and FIGURE 4 is a schematic diagram of a control circuit for use with a sensor constructed in accordance with this invention.

DESCRIPTION OF THE PREFERRED EMBODIMENT

Referring to FIGURE 1 where one example of a gas detecting system is shown, air is drawn in the direction of the arrows successively through filter 11 for removal of background gas and other contamination, through passageway 12 and mixing chamber 13, and through the detecting element 14 via passageway 15 by means of vacuum pump 16 connected to the detecting element 14 by a tube 17. The leak detector probe 21 is passed near welds, seams, joints or other areas suspected of leakage, and the associated atmosphere is drawn through variable orifice 18 to the detector 14 via the mixing chamber 13 and the passageway 15. The mixture of the gas passing through the filter 11 and variable orifice 18 is passed through the electrical discharge device or sensitive element in the detector 14 to induce positive ion formation at the positively charged electrode in a manner well known in the art and described in more detail in the aforesaid Rice patent. Variations in the resultant current flow are indicated by the indicator and/or alarm 19 with the magnitude of variation being dependent upon the amount of tracer gas present. In a typical installation, detector 14, filter 11, indicator and/or alarm 19, and the vacuum pump 16 are assembled within a unit which may be conveniently referred to as a control unit 20. The variable orifice 18 and the chamber 13 are housed in a probe 21 and connected to the control unit 20 by a flexible tube 22 which may contain both the passageway 12 and the passageway 15. Since vacuum pump 16 draws a predetermined gas flow through the detector 14, the size of the variable orifice determines the proportion of the total flow supplied to the variable orifice with the remainder coming from the filter 11 and the passageway 12.

An example of an electrical discharge device or sensitive element which could be housed in the detector 14 is shown in FIGURE 2 and comprises a base member 23 and a housing member 24 disposed on the base member 23. The housing has an aperture 25 formed therethrough, and a like aperture (not shown) is formed in the base 23 to allow gas to pass through the sensing element.

The interior of a sensing element formed in accordance with this invention is shown in detail in FIGURE 3 with the cover element 24 removed. The base member 23 shows the lower aperture 26 through which gas may be emitted in the direction of the arrow 27.

The sensing element itself comprises an outer, collector electrode 30 connected to a terminal pin 30a and an inner, emitter electrode 31 connected to a terminal pin 31a. Both electrodes are formed of platinum or a platinum-containing alloy. Although the exact configuration of the collector and emitter electrodes 30 and 31 is not important, it has been found that a cylindrical formation of these electrodes does provide simplified manufacturing. Both electrodes are mounted to the base 23 and spaced therefrom by supports 32.

The emitter electrode 31 is disposed about and contiguous to a central core member which has a center portion composed of a thermistor material which is generally designated by the numeral 33. Sensing electrodes are deposited on the surface of the thermistor 33; and when the sensing thermistor 33 is cylindrical as shown in FIGURE 3, the electrodes, denoted by numerals 34 and 35, may be diametrically opposed. The electrode 34 is then coupled to a terminal pin 36 by a conductor 37 while the electrode 35 is coupled to a terminal 40 by a conductor 41. Therefore, the resistance between the terminal pins 36 and 40 will indicate the temperature of the thermistor 33.

The thermistor 33 and the electrodes 34 and 35 are encased in an impervious tube 42 which, in turn, is surrounded by an alkali-containing, emitter activator material 43, such as rubidium. A heater coil 44, wound about the impervious tube 42, is embedded in the alkali material 43 and connected to other terminal pins on the base 23, but not shown in FIGURE 3.

Any number of materials can be used for the thermistor 33 if they satisfy several criteria. The material must be electrically and mechanically stable at normal operating conditions. In addition, the change in resistivity for temperature deviations from normal operating temperatures must provide a usable current change. The same criteria exist for the impervious tube 42 except that the volume resistivity constant of the material constituting the impervious tube 42 must be at least an order of magnitude greater than that for thermistor 33. The impervious tube 42 and central core 33 both contact the sensing electrodes 34 and 35 to thereby constitute parallel electrical resistors. When the volume resistivity of the impervious tube 42 is at least an order of magnitude greater than that for the thermistor 33, changes in the resistivity of the impervious tube 42 do not significantly affect the total impedance between the sensing electrodes 34 and 35. Rather, the only significant effect will be produced by changes in the resistance of the thermistor material 33 which is directly related to temperature of the detector.

Certain ceramic materials exhibit these characteristics. They are generally those ceramics which include as a primary constituent magnesium oxide, zirconium oxide (zirconia), titanium oxide, aluminum oxide (alumina), beryllium oxide, calcium oxide (calcia), yttrium oxide or silicon oxide (silica). It has been found that two of the above-mentioned ceramics are particularly well suited for use in a halogen gas detector.

EXAMPLE I

The thermistor 33 is composed of a calcia stabilized zirconia. Platinum electrodes 34 and 35 are contiguous to the thermistor 33 and the impervious tube 42 which is composed of alumina having a volume resistivity approximately two orders of magnitude greater than that of the calcia stabilized zirconia.

EXAMPLE II

An alumina ceramic is used as a primary constituent in the thermistor 33 while another alumina ceramic, having a volume resistivity approximately two orders of magnitude greater than that of the thermistor 33, forms the impervious tube 42. Platinum electrodes are used.

Merely packing the ceramic material constituting the thermistor 33 in the impervious tube 42 is sufficient. During normal operation some ceramic sintering does occur. However, if desired, presintering can be incorporated into the manufacturing process.

By substituting the thermistor 33 in the electrical circuit shown in FIGURE 4, it is possible to control the energy supplied to the heater coil 44 and thereby maintain the operating temperature of the sensor. As shown in FIGURE 4, the thermistor, designated by numeral 33', is connected into the circuit by means of the terminal pins 36 and 40. The heater 44' is connected into the circuit by means of terminal pins represented by numerals 45 and 46.

The heater 44' is energized by a low-voltage winding 47 on a transformer 50 having a primary 51 including terminals 52 and 53 adapted to be connected to a power supply 54 shown in phantom. The energy level of the heating element 44' is controlled by a half-wave SCR (Silicon Controlled Rectifier) control circuit constituted by a parallel circuit of an SCR 55 and a diode 56, the parallel circuit being in series between the heating element 44' and the transformer secondary 47.

This circuit arrangement produces a fixed heating current for each half-cycle that the diode 56 is biased in a forward direction. During alternate half-cycles, conduction is controlled by the SCR 55.

The conduction of the SCR 55 is controlled by a firing circuit which includes the thermistor 33'. A secondary 57 of the transformer 50 energizes the timing circuit which initially comprises a series connection of two Zener diodes 60 and 61, poled to provide a regulated Zener voltage when the SCR 55 anode is biased for conduction, and the resistor 62. During the alternate half-cycles when the diode 56 is conductive, Zener diodes 60 and 61 are forward biased s othe timing circuit is effectively switched off. The regulated voltage appearing across the Zener diodes 60 and 61 also appears across a series resistor network comprising a resistor 63 and a potentiometer 64 in series with the thermistor 33'. The junction of the resistors 63 and 64 is connected to the base electrode of a transistor 65, the emitter and collector electrodes being coupled across the Zener diode 61. As the temperature increases, the resistance of the thermistor 33' decreases because ceramic materials generally have a negative thermal coefficient of resistivi'y. Therefore, the conductivity of the transistor 65 decreases, causing the voltage across a resistor 66, in parallel with the collector and emitter electrodes, to increase. This voltage is then coupled to the base of another transistor 67, the emitter and collector of which are also coupled across the Zener diode 61. Increasing the voltage on the base of the transistor 67 will therefore increase its conductivity so that the voltage across two load resistors 70 and 71 decreases. The junction of the resistors 70 and 71 is coupled to the gate of a controlling SCR 72 in parallel with the SCR 55. The SCR 72, a low-power SCR, then fires or controls the firing of the SCR 55. Capacitors 73 and 74 in series with the resistors 70 and 71 provide A-C phase shift so that the SCR 55 and a control SCR 72 fire at or near a zero anode-cathode voltage when the gate-anode voltage is sufficient to cause firing as is well known in the art.

Therefore, it can be seen that if the temperature sensed by the thermistor element 33' increases causing a decrease in its resistance, the conductivity of the transistor 65 will decrease, causing the base-emitter voltage of the transistor 67 to increase and the collector-emitter voltage to decrease. This causes the gate-anode voltage on the SCR 72 to decrease to a value which prevents firing of the SCR 72 during a half-cycle of proper bias. This, in turn, prohibits the firing of the main SCR 55 current conduction for that half-cycle through the heating element 44'.

In accordance with this invention, a leak-detecting system includes a leak detector sensor having means integral therewith to measure the temperature of the emitter and through control means to maintain the emitter at a constant temperature level to thereby stabilize the sensitivity and increase the accuracy of the mechanism. It will be obvious that many modifications can be made in the exact configuration of the sensor and in the electrical control circuit which is revealed. Therefore, it is the object of the appended claims to cover all such variations which come within the true spirit and scope of this invention.

What is claimed as new and desired to be secured by Letters Patent of the United States is:

1. In an ionic halogen gas detector including support means, spaced emitter and collector electrodes mounted on said support means, a plurality of terminal means including first terminal means connected to the emitter and collector electrodes, and means for heating the emitter electrode, the improvement of a central core member about which the emitter is contiguously disposed comprising:
   (a) an inner thermistor portion which exhibits a change in resistivity for a change in temperature and electrical and mechanical stability at normal operating temperatures;
   (b) spaced sensing electrodes contiguous to portions of said thermistor portion and adapted to be connected to second terminal means;
   (c) an impervious member contiguous to said thermistor portion and said spaced sensing electrodes;
   (d) emitter activating means composed of an alkali-containing material spacing said emitter electrode from said impervious member whereby the resistance of said thermistor portion between said spaced sensing electrodes indicates the sensor temperature.

2. An ionic halogen gas detector as recited in claim 1 having an electrical heating element, said heating element being supported adjacent said impervious member in said emitter activating means and being adapted to be connected to third terminal means.

3. An ionic halogen gas detector as recited in claim 2 wherein the emitter and collector electrodes are spaced, concentric and annular, the emitter electrode being an inner electrode, said thermistor portion being generally cylindrical, said spaced sensing electrodes being diametrically opposed, said impervious member and said emitter activating means being generally annular and said heating element being constituted by a heater coil wrapped about said impervious member.

4. An ionic halogen gas detector as recited in claim 2, said thermistor portion being composed of a ceramic material having as a primary constituent thereof an oxide of an element taken from the group consisting of: aluminum, beryllium, calcium, magnesium, silicon, titanium, yttrium, and zirconium, said ceramic material having a given volume resistivity, said impervious member being composed of another of said ceramic materials having a volume resistivity at least one order of magnitude greater than said given value.

5. An ionic halogen gas detector as recited in claim 2, said thermistor portion being composed of a calcia-stabilized zirconia ceramic, said spaced sensing electrodes being composed of platinum and said impervious member being composed of an alumina ceramic.

6. An ionic halogen gas detector as recited in claim 2, said thermistor portion being composed of an alumina ceramic, said spaced sensing electrodes being composed of platinum and said impervious member being composed of another alumina ceramic.

7. In a halogen gas detector system including a gas sampling means, conduit means, halogen gas sensing means and pump means for moving gas into the sampling means and through the conduit means and the gas sensing means, the improvement of a halogen gas sensor including means for regulating the sensor operating temperature comprising:
   (a) support means;
   (b) a plurality of terminal means mounted on said support means;
   (c) spaced concentric platinum electrodes mounted on said support means and connected to first terminal means, the inner of said electrodes constituting an emitter electrode;
   (d) a core member within said emitter electrode and contiguous therewith including:
      (1) an inner thermistor portion composed of a ceramic material having as a primary constituent thereof an oxide of an element taken from the group consisting of aluminum, beryllium, calcium, magnesium, silicon, titanium, yttrium, and zirconium, said ceramic material having a given value of volume resistivity;
      (2) spaced sensing, platinum-containing electrodes contiguous to portions of said thermistor material and diametrically opposed thereon connected to second terminal means;
      (3) an impervious member contiguous to said thermistor portion and said spaced sensing electrodes and composed of another of said ceramic materials having a volume resistivity at least an order of magnitude greater than said given value;
      (4) a heater coil wrapped about said impervious member and connected to third terminal means;
      (5) emitter activating means composed of an alkali-containing material spacing said emitter electrode from said impervious member and additionally supporting said heater coil adjacent said impervious member whereby the resistance of said thermistor portion between said spaced sensing electrodes indicates the sensor temperature; and
   (e) heater control means connected to said second and third terminal means for controlling the energization level of said heater coil in response to the resistance of said thermistor portion between said sensing spaced electrodes.

8. A halogen gas detector system as recited in claim 7, said thermistor portion being composed of a calcia-stabilized zirconia ceramic, said impervious member being composed of an alumina ceramic having a volume resistivity approximately two orders of magnitude greater than said given value and said emitter activating means being composed of rubidium.

9. A halogen gas detector system as recited in claim 7, said thermistor portion being composed of an alumina ceramic, said impervious member being composed of another alumina ceramic having a volume resistivity approximately two orders of magnitude greater than said given value and said emitter activating means being composed of rubidium.

10. A halogen gas detector system as recited in claim 7 wherein said heater coil is adapted to be energized by an A-C power source, said heater control means selectively controlling the conduction of half-cycles of one polarity and allowing full conduction of cycles of an opposite polarity whereby said heater coil is energized by a controlled half-wave plus a fixed half-wave.

References Cited
UNITED STATES PATENTS

| | | | |
|---|---|---|---|
| 2,795,716 | 6/1957 | Roberts | 313—7 |
| 2,996,661 | 8/1961 | Roberts | 324—33 |
| 3,044,012 | 7/1962 | Zito et al. | 313—7 X |

JAMES W. LAWRENCE, Primary Examiner

R. F. HOSSFELD, Assistant Examiner

U.S. Cl. X.R.

313—7, 230; 324—33